US009613012B2

(12) United States Patent
Roy et al.

(10) Patent No.: US 9,613,012 B2
(45) Date of Patent: Apr. 4, 2017

(54) SYSTEM AND METHOD FOR AUTOMATICALLY GENERATING KEYWORDS

(71) Applicant: Dell Products L.P., Round Rock, TX (US)

(72) Inventors: Mainak Roy, Kolkata (IN); Sharmad S. Naik, Bangalore (IN); Deepak Ravishankar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 474 days.

(21) Appl. No.: 14/089,360

(22) Filed: Nov. 25, 2013

(65) Prior Publication Data

US 2015/0149892 A1 May 28, 2015

(51) Int. Cl.
*G06F 17/21* (2006.01)
*G06F 17/22* (2006.01)
*G06F 17/27* (2006.01)

(52) U.S. Cl.
CPC .......... *G06F 17/2247* (2013.01); *G06F 17/27* (2013.01)

(58) Field of Classification Search
CPC .... G06F 17/20; G06F 17/27; G06F 17/30864; G06F 17/30899; G06F 17/30896; G06F 17/3089; G06F 17/2247
See application file for complete search history.

(56) References Cited

U.S. PATENT DOCUMENTS

| 6,938,083 | B1 * | 8/2005 | Teague | G06F 17/30864 |
| | | | | 707/999.101 |
| 6,976,025 | B2 | 12/2005 | Luk et al. | |
| 7,574,449 | B2 * | 8/2009 | Majumder | G06F 17/3069 |
| 7,849,201 | B1 * | 12/2010 | Subbarao | G06F 15/16 |
| | | | | 370/229 |
| 8,713,034 | B1 * | 4/2014 | Curtis | G06F 17/30616 |
| | | | | 707/748 |
| 9,330,071 | B1 | 5/2016 | Ahmed et al. | |
| 2007/0016577 | A1 * | 1/2007 | Lasa | G06F 17/30899 |
| 2007/0136248 | A1 * | 6/2007 | Sarid | G06F 17/30654 |
| 2008/0059897 | A1 | 3/2008 | Dilorenzo | |
| 2008/0071929 | A1 | 3/2008 | Motte et al. | |
| 2009/0119329 | A1 * | 5/2009 | Kwon | G06F 17/30899 |

(Continued)

OTHER PUBLICATIONS

How to Get More Youtube Subscribers, "Using the Youtube Keyword Tool to Improve Your Video Ranking", Jan. 15, 2013, 3 pages.

(Continued)

*Primary Examiner* — Wilson Tsui
(74) *Attorney, Agent, or Firm* — Winstead PC

(57) ABSTRACT

An information handling system is disclosed for generating tags of a file including a document or a webpage posting. The generating tags of a file include converting a webpage posting to a PDF document. The method further includes extracting tags provided by users. The method includes scanning the extracted data from a glossary PDF document to identify keywords of the glossary PDF document in accordance with a sentence length. The method further includes extracting data from the PDF document and scanning the extracted data to identify keywords of the PDF document in accordance with a sentence length. The method further includes reapplying selected keywords to the tags of the file.

14 Claims, 5 Drawing Sheets

(56) References Cited

U.S. PATENT DOCUMENTS

| | | | |
|---|---|---|---|
| 2009/0249194 A1* | 10/2009 | Day ................. | G06F 17/30905 715/239 |
| 2010/0185664 A1 | 7/2010 | Baggott et al. | |
| 2011/0066624 A1* | 3/2011 | Turakhia ........... | G06F 17/30864 707/748 |
| 2011/0225159 A1* | 9/2011 | Murray ............. | G06F 17/30713 707/739 |
| 2013/0159306 A1* | 6/2013 | Janssen, Jr. ....... | G06F 17/30737 707/737 |

OTHER PUBLICATIONS

Walt, Ahmad, "18 Free SEO Keyword Tools That You Need to Know", Apr. 9, 2012, 5 pages.
Wordstream, "WordStream Internet Marketing Software", 2013, 3 pages.
Google, "Using Keyword Planner to get keyword ideas and traffic estimates", 2013, 10 pages.
Seo Book, "Keyword Tool", 2013, 4 pages.

* cited by examiner

SYSTEM AND METHOD FOR AUTOMATICALLY GENERATING KEYWORDS

BACKGROUND

Technical Field

The present invention relates generally to data analytics and more particularly, but not by way of limitation, to systems and methods for automatically generating keywords.

History of Related Art

In content management systems based on, for example, a technical support site or a technical center, product and product related data are frequently searched including specific keywords related thereto. Visibility of product or product related data in many conventional systems are based on page rank. Using conventional keyword tagging strategy, for example, documents are manually tagged with unique keywords by, for example, engineers, marketing personnel, quality team members, Subject Matter Experts (SME) or Product Champions. With the huge amount of product data generated and published on a daily basis, for example, in the form of Product documentation, Wikis, Blogs, Videos, and Whitepapers, efforts by personnel to manually enter keywords to increase product data visibility and making product searchable, for example, on Internet web site with minimal search cycles may not be possible with current product support staffing levels. Furthermore, reductions in keyword search cycles may result in decreased Product Support call volumes, for example, Requests for Information (RFI), and open marketing opportunity for Product Marketing Staff of new products or support services to callers.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on an information handling system, a request for generating tags of a file. The file includes a document or a webpage posting. The webpage posting, for example, can be defined by a file extension or a file type. The generating tags of a file include converting a webpage posting to a PDF document. The method further includes extracting tags provided by users, and adding the extracted tags provided by the users to a database or flat file associated with the file. In addition, the method includes extracting data from a glossary PDF document. The glossary PDF document may be made available, for example, as a global link. Further, the method includes scanning the extracted data of the glossary PDF document to identify keywords of the glossary PDF document in accordance with a sentence length. The identified keywords of the glossary PDF, in one instance, being stored in a database or a flat file associated with the file. In addition, the method includes extracting data from the PDF document. Further, the method includes scanning the extracted data to identify keywords of the PDF document in accordance with a sentence length. In addition, the method includes reapplying selected keywords from the database or flat file to the tags of the file.

In one instance of the above method, the scanning of the extracted data to identify keywords of the glossary PDF document or the PDF document in accordance with a sentence length includes: checking the sentence length within the glossary PDF document or the PDF document. Continuing with this instance, the method further includes for two words or less sentences, identifying as command line option, and if the first word is an article, then add a second word of the sentence to an array of keywords, and otherwise add both words. In addition, the method includes for two or more word sentences, checking for bold words and adding the bold words as the identified keywords, and if no bold words, then parsing the two or more word sentence(s), finding nouns, adding each of the nouns to the array of keywords. In one instance, the method includes tabulating a count that each keyword in the database or flat file appears in the PDF document. The count can be based, at least in part, on the count.

In one embodiment, an information handling system includes a processing unit. The processing unit is operable to receive a document or a webpage posting. The webpage posting, for example, defined by a file extension or a file type. The processing unit further operable to receive a request to generate tags of a file including converting a webpage posting to a PDF document. The processing unit is further operable to extract tags provided by users, and add the extracted tags provided by the users to a database or flat file associated with the file. In addition, the processing unit is operable to extract data from a glossary PDF document. The glossary PDF document can be made available, for example, as a global link. Further, the processing unit is operable to scan the extracted data of the glossary PDF document to identify keywords of the glossary PDF document in accordance with a sentence length. The identified keywords of the glossary PDF, in one instance, is stored in a database or a flat file associated with the file. In addition, the processing unit is further operable to extract data from the PDF document. Further, the processing unit is operable to scan the extracted data of the PDF document to identify keywords of the PDF document in accordance with a sentence length. In addition, the processing unit is operable to reapply selected keywords from the database or flat file to the tags of the file.

In one instance of the information handling system, the scan of the extracted data to identify keywords of the glossary PDF document or the PDF document in accordance with a sentence length includes: checking the sentence length within the glossary PDF document or the PDF document. Continuing with this instance, the scan can include, for two words or less sentences, identifying as command line option, and if a first word is an article, then adding a second word of the sentence to an array of keywords, and otherwise adding both words. In one instance, the processing unit is operable, for two or more word sentences, to check for bold words and add the bold words as the identified keywords, and if no bold words, then to parse the two or more word sentence(s), find nouns, and add each of the nouns to the array of keywords. In one instance, the processing unit is operable to tabulate a count that each keyword in the database or flat file appears in the PDF document. The count can be based, at least in part, on the count.

In one embodiment, a computer-program includes a computer usable medium having computer-readable program code embodied therein. The computer-readable program code is adapted to implement a method. The method includes receiving a request for generating tags of a file. The file includes a document or a webpage posting. The webpage posting, for example, can be defined by a file extension or a file type. The generating tags of a file include converting a webpage posting to a PDF document. The method further includes extracting tags provided by users, and adding the extracted tags provided by the users to a database or flat file associated with the file. In addition, the method includes extracting data from a glossary PDF document. The glossary PDF document may be made available, for example, as a global link. Further, the method includes scanning the extracted data of the glossary PDF document to identify keywords of the glossary PDF document in accordance with a sentence length. The identified keywords of the glossary PDF, in one instance, being stored in a database or a flat file associated with the file. In addition, the method includes extracting data from the PDF document. Further, the method includes scanning the extracted data to identify keywords of the PDF document in accordance with a sentence length. In addition, the method includes reapplying selected keywords from the database or flat file to the tags of the file.

In one instance of the computer-readable program code, the scanning of the extracted data to identify keywords of the glossary PDF document or the PDF document in accordance with a sentence length includes: checking the sentence length within the glossary PDF document or the PDF document. Continuing with this instance, the method further includes for two words or less sentences, identifying as command line option, and if the first word is an article, then add a second word of the sentence to an array of keywords, and otherwise add both words. In addition, the method includes for two or more word sentences, checking for bold words and adding the bold words as the identified keywords, and if no bold words, then parsing the two or more word sentence(s), finding nouns, adding each of the nouns to the array of keywords. In one instance, the method includes tabulating a count that each keyword in the database or flat file appears in the PDF document. The count can be based, at least in part, on the count.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
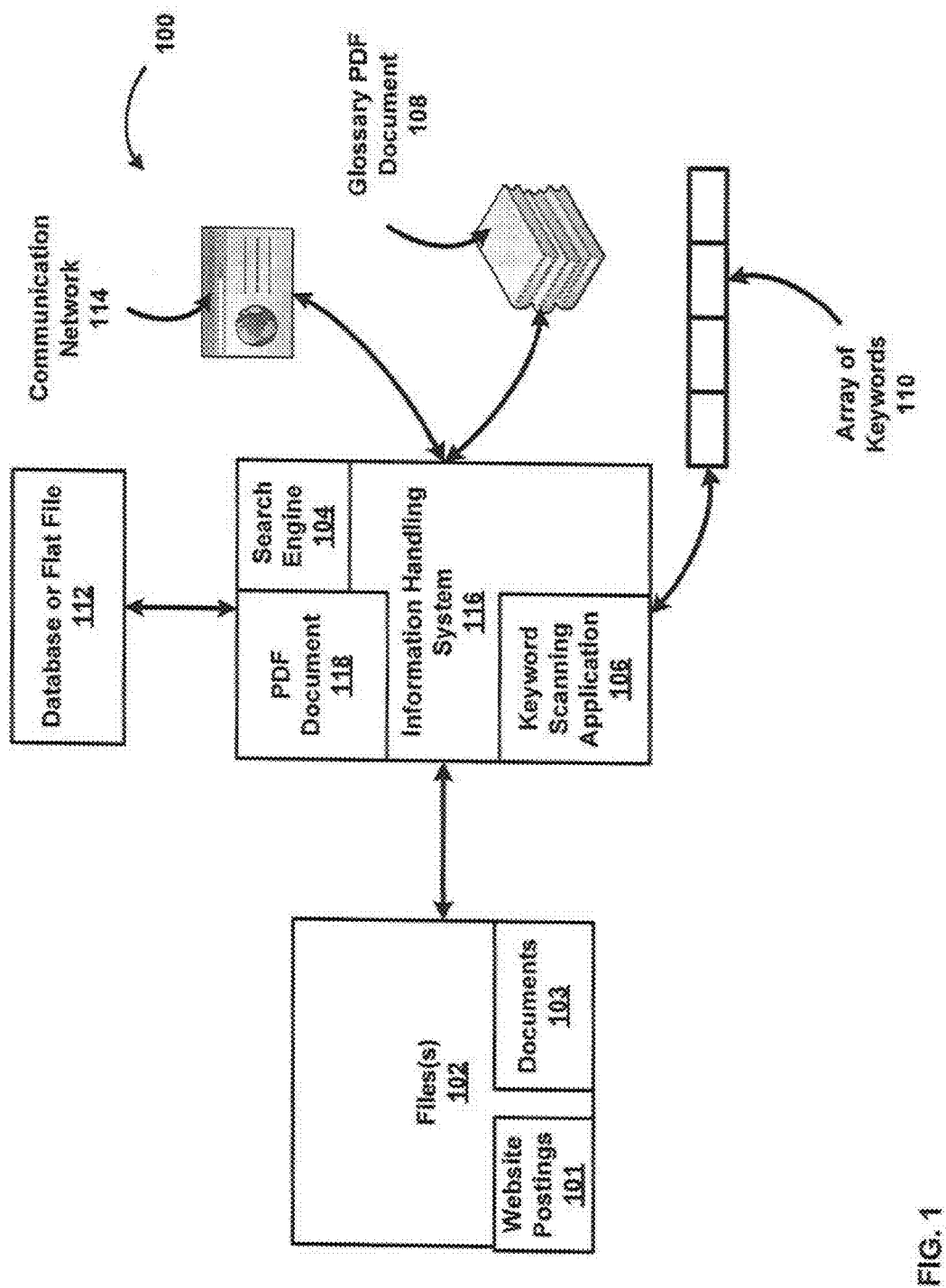
FIG. 1 illustrates a keyword generation system.

In various embodiments, keywords can be generated more reliably and effectively utilizing systems and methods described herein. In a typical embodiment, a method includes, on an information handling system, receiving a request for generating tags of a file. Keywords are extracted and reapplied to tags of the file. As described in more detail below, in a typical embodiment, scanning, extraction, and reapplying the extracted keywords in the file to increase visibility of data in the file, the page rank of relevant product or data files, and streamline keyword search results, and the processing can be accomplished automatically across myriads of files including documents and website posting on the Internet.

For purposes of this patent application, a keyword or keywords, is a word used by a search engine, e.g., keyword scanning application, in its search for relevant items in a file, for example, a document or website posting on internal or external Internet sites.

A search engine, as used herein, is a software program that searches files including files including documents and website postings, for example, on the World Wide Web, for a specified word or words or keywords and provides a list of documents and website postings in which they are found.

A file or file(s), as used herein, is/are document(s) or website posting(s) on internal or external Internet sites.

A glossary PDF document, as used herein, is a document including a term bank or a list of terms in a special subject, field, or area of usage, for example, computer products, software products, and computer and software support services, with accompanying definitions or meanings.

A tag or tags, as used herein, is a word or group of words that provide a useful way to group related files together and quickly tell readers what a file is about. In one example, marketing personnel, engineers, and subject matter experts (SMEs) develop keywords to increase a document's page rank or visibility during an Intranet or Internet search.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates a system 100 for keyword generation. The keyword generation system 100 includes file(s) 102, a search engine 104, a keyword scanning application 106, a glossary PDF document 108, a keyword array 110, a database or flat file 112, a communication network 114, an information handling system 116, and a PDF document 118. The database or flat file 112 can be a computer server or storage device that collects related keyword data on a per file basis and is organized for convenient access through a website using a computer. The communication network 114 can be, for example, the Internet or a public or private Intranet.

The file(s) 102 can be, for example, document(s) 103, website postings 101(s), etc. The PDF document 118 is typically a PDF representation of the file(s) 102. In some cases, the file(s) 102 may natively exist in a PDF format. In these cases, the file(s) 102 and the PDF document 118 may be the same document/file. In other cases, such as with the website postings 101(s), the file(s) 102 may natively exist in a non-PDF format. In these cases, the file(s) 102 can be converted into the PDF document 118.

Figure 3:
FIG. 3 illustrates a glossary PDF document.

In some embodiments, the glossary PDF document 108 may be global across, for example, all products supported by a given organization. In other embodiments, the glossary PDF document 108 can be specific to a particular product. The search engine 104 can search for keywords in the file(s) 102. The search engine 104 can be, for example, GOOGLE, YAHOO, ASK, BING, YANDEX, BAIDU, and/or the like. In various embodiments, processes described herein can optimize handling of the file(s) 102 by the search engine 104 for a product or group of products. By way of example, the glossary PDF document 108 can be, as illustrated in FIG. 3, a listing of terms and definitions that describe products and services offered by an enterprise.

In a typical embodiment, the keyword scanning application 106 is operable to acquire keywords for the file(s) 102 and store them in the database or flat file 112 as pertaining to the file(s) 102. In various embodiments, the keyword scanning application 106 acquires the keywords from at least three sources: user-generated keyword tags associated with the file(s) 102, the glossary PDF document 108, and the contents of the file(s) 102. The user-generated keywords tags associated with the file(s) 102 typically include words that a user such as, for example, an author of the file(s) 102, has manually chosen for the file(s) 102. An example of the user-generated keywords tags will be described with respect to FIG. 2. To acquire keywords from the content of the file(s) 102, the keyword scanning application 106 can execute a PDF parsing and extraction process with respect to the PDF document 118. In similar fashion, to acquire keywords from the PDF glossary 108, the keyword scanning application 106 can execute the PDF parsing and extraction process with respect to the glossary PDF 108.

An example of the PDF parsing and extraction process will be described with respect to FIGS. 4-5. However, in general, the keyword scanning application 106 is operable to perform a sentence-by-sentence analysis of the contents of the PDF 118 and the contents of the glossary PDF document 108, as applicable. As each sentence is analyzed, keywords identified therein can be stored in the array of keywords 110. At the conclusion of the analysis of a given sentence, any keywords identified in the given sentence can be stored in the database or flat file 112.

The database or flat file 112 generally maintains a comprehensive list of all keywords identified for the file(s) 102, regardless of source, and counts a number of occurrences of each keyword in the contents of the PDF document 118. In that way, the database or flat file 112 can serve as a term bank that includes keywords for consideration with respect to file(s) 102. Once the comprehensive list has been compiled, for example, from the three sources described above, the database or flat file 112 will generally include a count for each keyword listed therein. In various embodiments, the comprehensive list can be ranked in the database or flat file 112, for example, by a highest count. Thereafter, a user or administrator, for example, can select keywords based on configurable criteria. (e.g., top twenty keywords, keywords with a count over 15, etc.). The selected keywords can then be applied, for example, as tags to the file(s) 102 in conformance to a format of the file(s) 102 (e.g., PDF, website posting, etc.). In this fashion, retrieval and access via the search engine 104 can be optimized.

Figure 2:
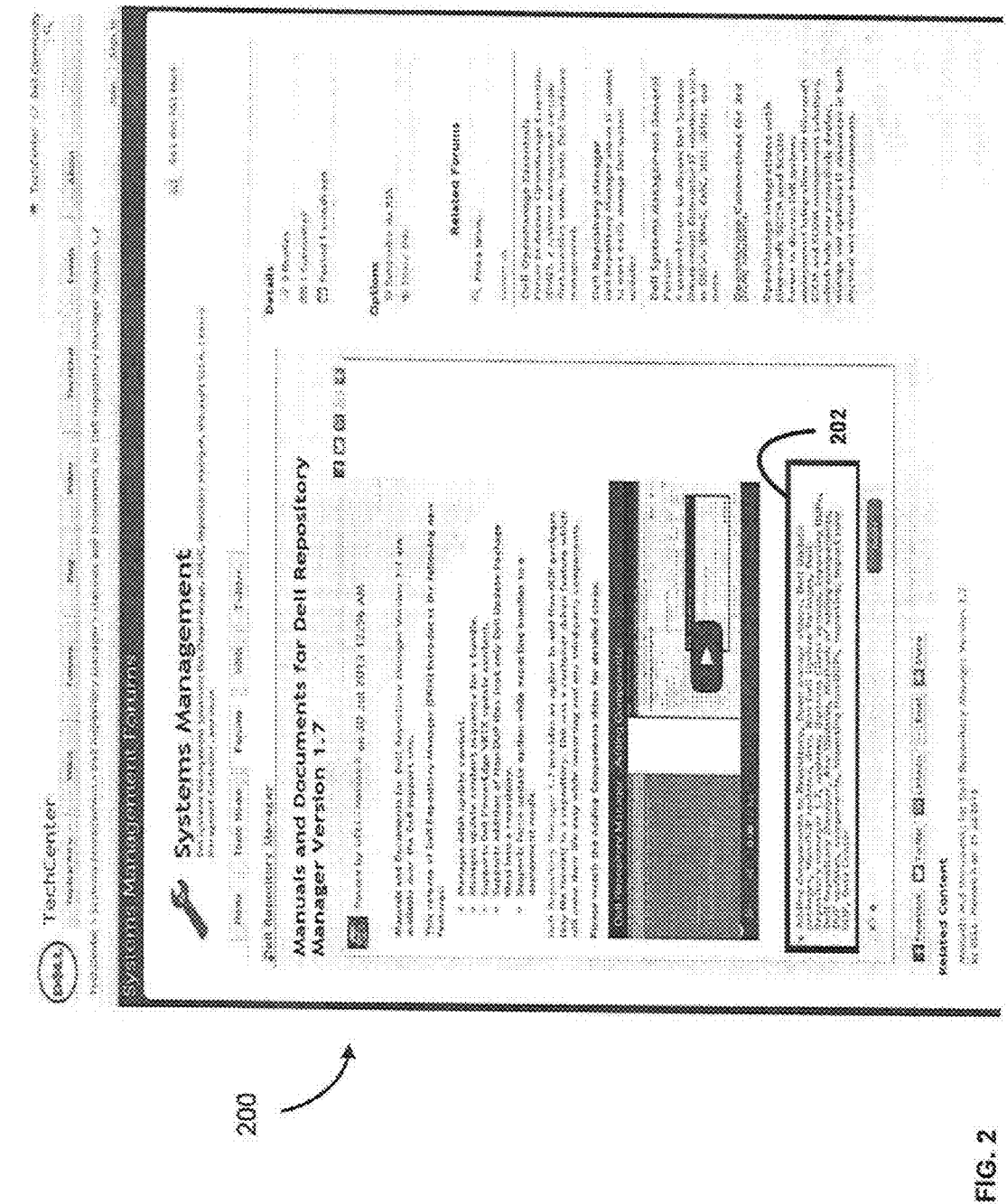
FIG. 2 illustrates a technology support center including one or more files including documents, urls, manuals, videos, and webpage posting(s)

FIG. 2 illustrates a technology support center 200 including support site manuals, e.g., Manuals and Documents for Dell Repository Manager Version 1.7. In a typical embodiment, the technology support center 200 includes links or urls to manuals and documents, links and urls to related site manuals or materials or videos, and access to related forums so users can additionally access additional documents or videos. The support center 200 provides a user urls and manuals on the site to better understand and access various product features, intended usage, and provide support materials therefor. The support center 200 further illustrates keywords 202 that can be included in user-generated tags. As described above, in various embodiments, the keywords 202 can be a keyword source for the keyword scanning application 106.

FIG. 3 illustrates a glossary PDF document 300. In a typical embodiment, the glossary PDF document 300 includes definitions of keywords used throughout the technology support center 200 including support site manuals to aid users' understanding of product and support manuals.

Figure 4:
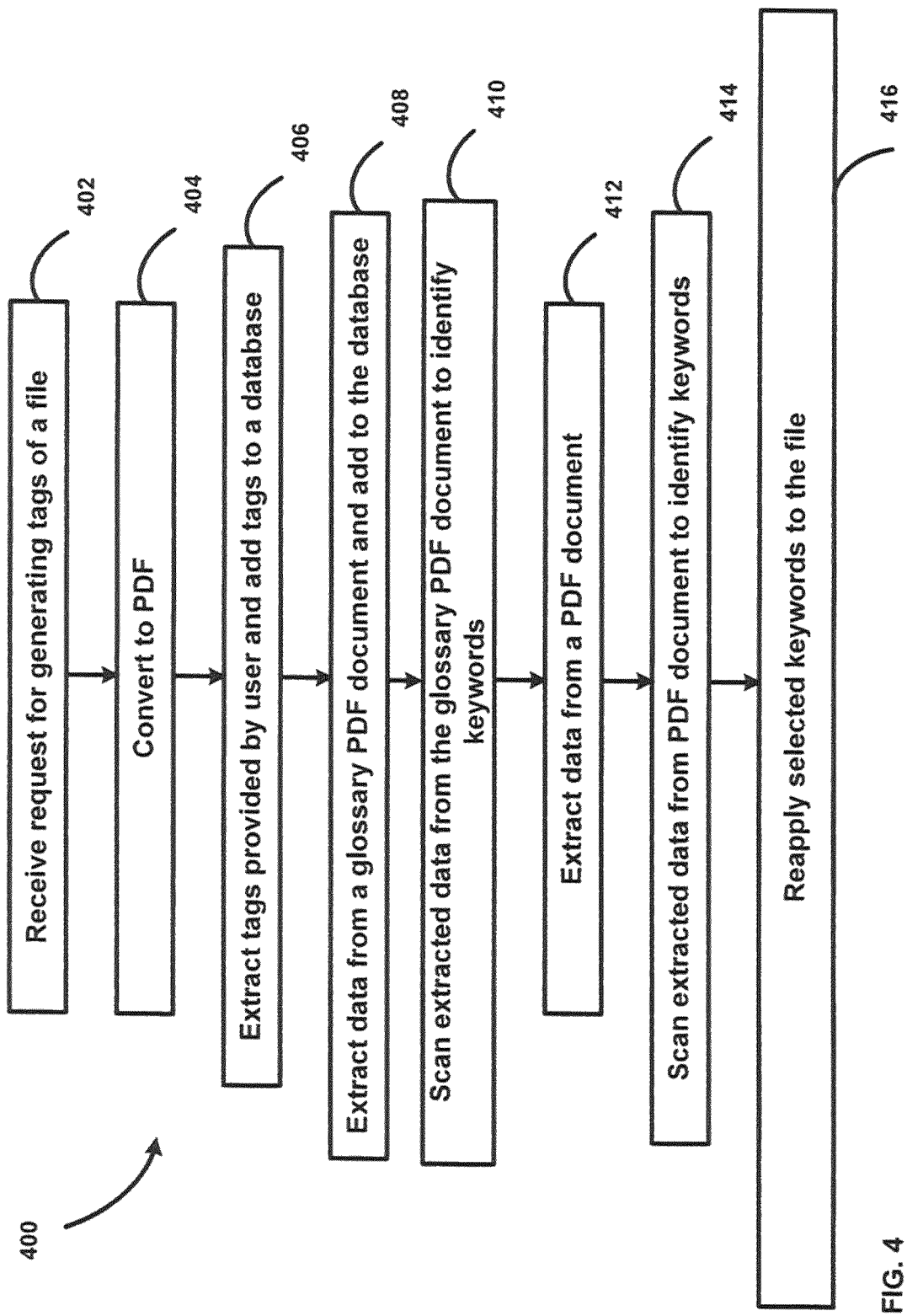
FIG. 4 illustrates a process for generating tags for a file.

FIG. 4 illustrates a process 400 for generating tags for a file. In a typical embodiment, the process 400 is performed by a keyword scanning application 106 resident and executing on an information handling system 116 as described with respect to FIG. 1. In various other embodiments, the keyword scanning application 106 may be, for example, external to the information handling system 116.

At step 402, the keyword scanning application 106 receives a request for generating tags of a file(s) 102. The request can be, for example, by a website owner, an administrator of the information handling system 116, a user, an author of the file(s) 102, and/or the like. The file(s) 102 can include a document(s) 103, a webpage posting(s) 101, etc. A type of the file(s) 102 can be defined by a file extension or a file type.

At step 404, the keyword scanning application 106 converts the file(s) 102 to the PDF document 118 (e.g., if the file(s) 102 is the webpage posting 101). In various embodiments, the step 404 can be omitted if, for example, the file(s) 102 is already in a PDF format. In these embodiments, the file(s) 102 and the PDF document 118 may be considered to refer the same file/document. At step 406, the keyword scanning application 106 extracts tags provided by users, and adds the extracted tags provided by the users to the database or flat file 112 in association with the file(s) 102.

At step 408, the keyword scanning application 106 extracts data from the glossary PDF document 108 (e.g., using PDF parsing functionality of the keyword scanning application 106). The glossary PDF document 108 can be available, for example, as a global link.

At step 410, the keyword scanning application 106 scans the extracted data to identify keywords of the glossary PDF document 108 in accordance, for example, with a sentence length, textual formatting, grammar, and/or other characteristics. In some cases, the step 410 can include performing an extraction process as described below with respect to FIG. 5. In other cases, if a style and format of the glossary PDF document 108 are known, the step 410 can include extracting all glossary terms based on the known style and format. The identified keywords of the glossary PDF 108, to the extent the terms are unique relative to the extracted tags from step 406, are typically added to the database or flat file 112. In some embodiments, as described with respect to FIG. 5, the keywords can be added to the database or flat file 112 on a sentence-by-sentence basis.

At step 412, the keyword scanning application 106 extracts data from the PDF document 118 (e.g., using PDF parsing functionality of the keyword scanning application 106). At step 414, the keyword scanning application 106 scans the extracted data. In various embodiments, the step 414 can include performing the extraction process described relative to FIG. 5 below to identify additional keywords in the contents of the PDF document 118. The keyword scanning application 106 can identify the additional keywords in accordance, for example, with a sentence length. The additional keywords, to the extent they are unique relative to other keywords in the database or flat file 112, can be added to the database or flat file 112. Again, as described with respect to FIG. 5, the additional keywords can be added to the database or flat file 112 in a sentence-by-sentence fashion. In addition, the step 414 can include tabulating a count (e.g., number of times) that each keyword associated with the file(s) 102 in the database or flat file 112 appears in the PDF document 118. In that way, the database or flat file 112 can serve as a term bank with respect to the file(s) 102.

At step 416, the keyword scanning application 106 reapplies selected keywords from the database or flat file 112 as tags of the file(s) 102. In various embodiments, the selected keywords can include those keywords in the database or flat file 112 that meet configurable criteria. The configurable criteria can be, for example, a predetermined number of top keywords (e.g., top twenty), a number of keywords that meet a configurable threshold (e.g., having a count greater than fifteen), and/or the like. The selected keywords can also be selected, for example, by a user, administrator, or author of the file(s) 102 after reviewing the keywords contained in the database or flat file 112. In various embodiments, the keywords contained in the database or flat file 112 can be presented on demand and/or responsive to performing a process such as, for example, the process 400.

Figure 5:
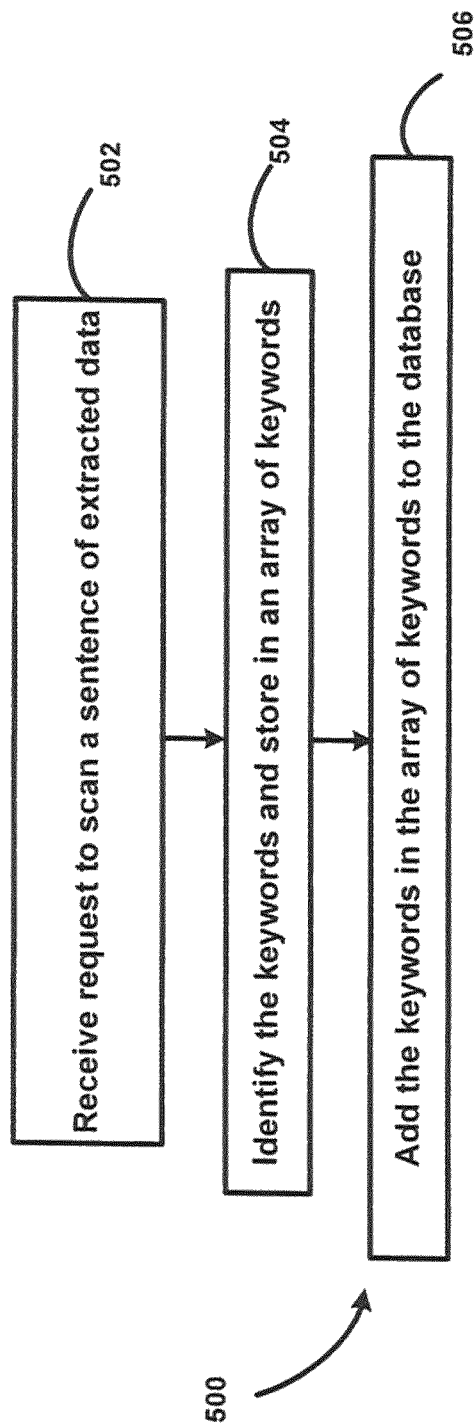
FIG. 5 illustrates a process for searching for a keyword in a string of a sentence in a file.

FIG. 5 illustrates a process 500 for searching for keywords in extracted data such as, for example, data extracted from the PDF document 118 or the glossary PDF document 108. In a typical embodiment, the process 500 is performed for each sentence in the extracted data. The process 500 can be performed by the keyword scanning application 106 in combination with the information handling system 116. The process 500 can be performed, for example, as all or part of the steps 410 and/or the step 414 of FIG. 4.

At step 502, the keyword scanning application 106 receives a request to scan a sentence of the extracted data, for example, from the PDF document 118 or the glossary PDF document 108, to identify keywords in accordance with a sentence length, textual formatting, grammar, and/or other characteristics.

At step 504, the keyword scanning application 106 identifies the keywords. For example, in one embodiment, sentence length can be a basis for identifying keywords. In these embodiments, the step 504 can include the keyword scanning application 106 checking the sentence length. For example, for sentences having two or fewer words, the keyword scanning application 106 can add all words of the sentence to the array of keywords 110. In some cases, a sentence of two or fewer words indicates a command line option and hence potential importance as a keyword. In some embodiments, if the two-or-fewer word sentence contains, for example, an article (e.g., 'a', 'an', 'the'), the article can be filtered from inclusion in the array of keywords 110.

By way of further example, textual-formatting characteristics can be included in the extracted data and used as a basis for identifying keywords in the sentence. In these embodiments, words in the sentence that exhibit a particular formatting characteristic such as, for example, being bolded, italicized, and/or the like can be identified as keywords. By way of further example, grammatical analysis can also serve as a basis for identifying the keywords. For example, nouns in the sentence can be extracted and identified as keywords. In various other embodiments, other parts of speech such as, for example, verbs may be extracted and included.

In various embodiments, the step 504 can combine two or more of the above methodologies for identifying keywords in a prioritized fashion. For example, in one embodiment, keyword identification can begin according to sentence length for purposes of identifying, for example, command line options as described above. In that way, all words of sentences having two or fewer words are added to the array of keywords 110. Therefore, no further keyword identification typically needs to occur with respect to that sentence. Subsequently, if the sentence has more than two words, keyword identification according to formatting can occur. For example, in some cases, all bolded words in the sentence can be added to the array of keywords 110. After that, keyword identification according to a grammatical analysis can occur. For example, all nouns of the sentence can be added to the array of keywords 110 (to the extent not already added, for example, as a bolded word).

At step 506, the keyword scanning application 106 adds the keywords in the array of keywords 110 to the database or flat file 112. In a typical embodiment, only unique ones of the array of keywords 110 are added to database or flat file 112.

In various embodiments, methodologies described above with respect to FIGS. 1-5 can be utilized by a user such as, for example, an author the file(s) 102, to reach a desired result with respect to keyword tags. For example, it may be that the user wants the file(s) to be tagged with a particular set of keywords (e.g., the user-generated tags described above). However, the user may also want the particular set of keywords to be an accurate representation of the content of the file(s) 102. In these embodiments, the user, optionally in conjunction with a subject matter expert, can use the methodologies described above to revise and/or redraft the file(s) 102 so that the keyword tags that are automatically generated match what the user desires (e.g., the user-generated tags).

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising,
on an information handling system, receiving a request to automatically generate search-engine keywords for a webpage posting;
converting, by the information handling system, the webpage posting to a PDF posting document;
extracting, by the information handling system, tags provided by users in relation to the webpage posting;
adding, by the information handling system, the extracted tags provided by the users as keywords to a database or flat file associated with the webpage posting;
extracting, by the information handling system, data from a glossary PDF document;
scanning, by the information handling system, the extracted data of the glossary PDF document to identify keywords of the glossary PDF document;
the information handling system adding to the database or flat file those of the identified keywords of the glossary PDF document that are unique relative to the database or flat file;
extracting, by the information handling system, data from the PDF posting document;
scanning, by the information handling system, the extracted data of the PDF posting document to identify keywords of the PDF posting document;
the information handling system adding to the database or flat file those of the identified keywords of the PDF posting document that are unique relative to the database or flat file;
the information handling system counting a number of times that each keyword in the database or flat file appears in the PDF posting document; and
applying, by the information handling system, selected keywords from the database or flat file to the webpage posting as the search-engine keywords of the webpage posting, wherein the selected keywords are selected based, at least in part, on the counted number of times that each keyword in the database or flat file appears in the PDF posting document.

2. The method of claim 1, wherein the glossary PDF document is available as a global link.

3. The method of claim 1, wherein the scanning, by the information handling system, the extracted data to identify keywords of the glossary PDF document or the PDF posting document includes:
checking a length of a sentence within the glossary PDF document or the PDF posting document; and
when the length of the sentence within the glossary PDF document or the PDF posting document is two words or less, identifying the sentence as a command line option, and if a first word of the sentence is an article, adding only a second word of the sentence to an array of keywords, and otherwise adding both words to the array of keywords.

4. The method of claim 1, wherein the scanning, by the information handling system, the extracted data to identify keywords of the glossary PDF document or the PDF posting document includes:
for sentences comprising two or more words, checking for bold words and adding the bold words to an array of keywords.

5. The method of claim 4, wherein the scanning, by the information handling system, the extracted data to identify keywords of the glossary PDF document or the PDF posting document includes:
responsive to no bold words being identified, parsing the sentences comprising two or more words to identify nouns, and
adding each of the nouns to the array of keywords.

6. An information handling system comprising a processor, wherein the processor is operable to:
receive a request to automatically generate search-engine keywords for a webpage posting;
convert the webpage posting to a PDF posting document;
extract tags provided by users in relation to the webpage posting;
add the extracted tags provided by the users as keywords to a database or flat file associated with the webpage posting;
extract data from a glossary PDF document;
scan the extracted data of the glossary PDF document to identify keywords of the glossary PDF document;
add to the database or flat file those of the identified keywords of the glossary PDF document that are unique relative to the database or flat file;
extract, by the information handling system, data from the PDF posting document;
scanning, by the information handling system, the extracted data of the PDF posting document to identify keywords of the PDF posting document;
add to the database or flat file those of the identified keywords of the PDF posting document that are unique relative to the database or flat file;
count a number of times that each keyword in the database or flat file appears in the PDF posting document; and
apply selected keywords from the database or flat file to the webpage posting as the search-engine keywords of the webpage posting, wherein the selected keywords are selected based, at least in part, on the counted number of times that each keyword in the database or flat file appears in the PDF posting document.

7. The information handling system of claim 6, wherein the glossary PDF document is available as a global link.

8. The information handling system of claim 6, wherein the scan of the extracted data to identify keywords of the glossary PDF document or the PDF posting document includes:
checking length of a sentence within the glossary PDF document or the PDF posting document; and
when the length of the sentence within the glossary PDF or the PDF posting document is two words or less, identifying the sentence as a command line option, and if a first word is an article, adding only a second word of the sentence to an array of keywords, and otherwise adding both words to the array of keywords.

9. The information handling system of claim 8, wherein the scan of the extracted data to identify keywords of the glossary PDF document or the PDF posting document includes:
for sentences comprising two or more words, checking for bold words and adding the bold words to the array of keywords.

10. The information handling system of claim 9, wherein the scan of the extracted data to identify keywords of the glossary PDF document or the PDF posting document includes:
responsive to no bold words being identified, parsing the sentences comprising two or more words to identify nouns,
and adding each of the nouns to the array of keywords.

11. A computer-program product comprising a non-transitory computer usable medium having computer-readable program code embodied therein, the computer-readable program code adapted to be executed to implement a method comprising, on an information handling system, receiving a request to automatically generate search-engine keywords for a webpage posting;

converting, by the information handling system, the webpage posting to a PDF posting document;

extracting, by the information handling system, tags provided by users in relation to the webpage posting;

adding, by the information handling system, the extracted tags provided by the users as keywords to a database or flat file associated with the webpage posting;

extracting, by the information handling system, data from a glossary PDF document;

scanning, by the information handling system, the extracted data of the glossary PDF document to identify keywords of the glossary PDF document;

the information handling system adding to the database or flat file those of the identified keywords of the glossary PDF document that are unique relative to the database or flat file;

extracting, by the information handling system, data from the PDF posting document;

scanning, by the information handling system, the extracted data of the PDF posting document to identify keywords of the PDF posting document;

the information handling system adding to the database or flat file those of the identified keywords of the PDF posting document that are unique relative to the database or flat file;

the information handling system counting a number of times that that each keyword in the database or flat file appears in the PDF posting document; and applying, by the information handling system, selected keywords from the database or flat file to the webpage posting as the search-engine keywords of the webpage posting, wherein the selected keywords are selected based, at least in part, on the counted number of times that each keyword in the database or flat file appears in the PDF posting document.

12. The computer-program product of claim 11, wherein the glossary PDF document is available as a global link.

13. The computer-program product of claim 11, wherein the identified keywords of the glossary PDF document being stored in the database or a flat file.

14. The method of claim 11, wherein the scanning the extracted data to identify keywords of the glossary PDF document or the PDF posting document includes at least two of the following:

i. checking a length of a sentence within the glossary PDF document or the PDF posting document;

ii. responsive to identifying a sentence comprising two words or less, identifying the sentence as command line option, and if a first word is an article, adding a second word of the sentence to an array of keywords, and otherwise adding both words to the array of keywords;

iii. responsive to identifying a sentence comprising two or more words, checking for bold words and adding the bold words to the array of keywords, and if no bold words are identified, parsing the sentence comprising two or more words, identifying nouns, and adding each of the nouns to the array of keywords; and iv. parsing word by word the array of keywords, and for unique words, adding the word to the database or flat file and for a non-unique word incrementing a counter of the non-unique word.

* * * * *